(12) United States Patent
Ab Malek et al.

(10) Patent No.: US 9,080,633 B2
(45) Date of Patent: Jul. 14, 2015

(54) SHOCK ABSORBING DEVICE FOR MATING OF AN INTEGRATED DECK TO JACKET LEGS

(75) Inventors: Kamarudin Ab Malek, Kuala Lumpur (MY); Ismaliza Ismail, Kuala Lumpur (MY); Hon Fei Wong, Kuala Lumpur (MY); Shamsul Kamaruddin, Kuala Lumpur (MY)

(73) Assignee: Lembaga Getah Malaysia (Malaysian Rubber Board), Kuala Lumpur (MY)

( * ) Notice: Subject to any disclaimer, the term of this patent is extended or adjusted under 35 U.S.C. 154(b) by 108 days.

(21) Appl. No.: 13/820,259

(22) PCT Filed: Jun. 27, 2012

(86) PCT No.: PCT/MY2012/000148
§ 371 (c)(1),
(2), (4) Date: Mar. 1, 2013

(87) PCT Pub. No.: WO2013/006032
PCT Pub. Date: Jan. 10, 2013

(65) Prior Publication Data
US 2013/0161887 A1 Jun. 27, 2013

(30) Foreign Application Priority Data
Jul. 7, 2011 (MY) .......................... PI 2011003204

(51) Int. Cl.
| | | |
|---|---|---|
| *F16F 7/00* | (2006.01) | |
| *F16F 1/40* | (2006.01) | |
| *E02B 17/02* | (2006.01) | |
| *F16F 1/30* | (2006.01) | |
| *F16F 3/08* | (2006.01) | |
| *F16F 1/34* | (2006.01) | |

(52) U.S. Cl.
CPC ................. *F16F 1/40* (2013.01); *E02B 17/024* (2013.01); *F16F 1/30* (2013.01); *F16F 1/34* (2013.01); *F16F 3/08* (2013.01)

(58) Field of Classification Search
CPC ................. F16F 1/30; F16F 3/08; F16F 1/34; F16F 1/40; F16F 1/42; F16F 9/306; E04H 9/022
USPC ............. 267/140.4, 141, 141.1, 141.2, 141.4; 405/204, 212; 248/636, 638
See application file for complete search history.

(56) References Cited

U.S. PATENT DOCUMENTS

| | | | |
|---|---|---|---|
| 4,222,683 | A | 9/1980 | Schaloske et al. |
| 4,848,967 | A | 7/1989 | Weyler et al. |

(Continued)

FOREIGN PATENT DOCUMENTS

EP  0487515 A2  5/1992

OTHER PUBLICATIONS

International Search Report received in PCT/MY2012/000148, mailed Oct. 11, 2012.

*Primary Examiner* — Melody Burch
(74) *Attorney, Agent, or Firm* — Suzannah K. Sundby, Esq.; Canady + Lortz LLP

(57) ABSTRACT

The present invention relates to a shock absorbing device (100) for mating an integrated deck to a jacket leg (51), characterized by: a hollow constraining cylinder (10) having a bottom closure (11), connected to the top of the jacket leg (51); an elastomer module (20) provided in the hollow constraining cylinder (10), wherein inner diameter of the hollow constraining cylinder (10) is larger than outer diameter of the elastomer module (20) thereby forming an annular space; a plurality of reinforcing plates (30) embedded within the elastomer module (20), vertically spaced apart from each other; a protective assembly comprising a elastomeric cap (41) and a minimum of one protective ring (42) mounted to the elastomeric cap (41); wherein during mating of the integrated deck to jacket leg (51), a support column (52) of the integrated deck abuts on the protective assembly and compresses the elastomer module (20) to secure the connection of the integrated deck to the jacket leg (51).

9 Claims, 4 Drawing Sheets

(56) References Cited

U.S. PATENT DOCUMENTS

| | | | |
|---|---|---|---|
| 5,083,623 A * | 1/1992 | Barrington | 175/321 |
| 5,219,451 A | 6/1993 | Datta et al. | |
| 5,265,552 A * | 11/1993 | Taylor | 114/219 |
| 6,385,918 B1 * | 5/2002 | Robinson | 52/167.8 |
| 8,196,912 B2 * | 6/2012 | Carlstedt et al. | 267/294 |
| 8,418,999 B2 * | 4/2013 | Kawada | 267/141.1 |
| 2002/0011387 A1 * | 1/2002 | Chu | 188/284 |
| 2002/0153183 A1 * | 10/2002 | Puterbaugh et al. | 180/89.13 |
| 2013/0206395 A1 * | 8/2013 | Cramer | 166/243 |

* cited by examiner

SHOCK ABSORBING DEVICE FOR MATING OF AN INTEGRATED DECK TO JACKET LEGS

BACKGROUND OF THE INVENTION

1. Field of the Invention

This invention relates to a shock absorbing device for use in an installation of an integrated deck to fixed jacket legs.

2. Description of Related Arts

An insatiable demand for the ever depleting oil and gas has forced the oil companies to move their offshore production to deeper and more distant fields. Locations of offshore production activities have moved from its initial water depth of 20 meters to deeper waters of greater than 300 meters during the past decades. As such, problems related to construction and fabrication of production structures intensify and become more complex. This will also inevitably lead to increase in the construction cost of the oil platform and the danger of the hazardous offshore working environment. It is therefore more economical, safe and effective to undertake all the platform construction work onshore. When completed, the platform will be transported on a barge to the chosen offshore location. It is during the installation of the platform to the jacket legs, which is pre-installed at the offshore location, that a protective shock absorbing means is needed to prevent a possible damage to the platform due to the impact of the load transferred to the jacket legs. In view of this, various designs of the protective shock absorbing components have been effectively deployed in many offshore projects.

U.S. Pat. No. 4,222,683 disclosed a joint between a platform leg and a jacket leg. When the platform leg impacts on the jacket leg of the substructure, the impacts are damped in horizontal and vertical direction. The top of support leg is provided with a receiving funnel and a counter bearing for force-lockingly joining the platform legs and jacket legs. A gap remains free between the side walls of the platform legs and the receiving funnel. The said gap is filled with blocks of elastic material circumferentially spaced from one another for absorbing the impact of the downward platform leg. A metal slide rail is coupled to each of the blocks of the elastic material, without which the platform legs would be too strongly braked by the blocks of elastic material during downward motion.

U.S. Pat. No. 5,219,451 disclosed a system for transferring an integrated deck to an offshore jacket legs wherein the integrated deck has a number of depending legs for mating with the jacket legs. A stabbing tip assembly is provided for the depending legs to locate the depending legs to the associated jacket legs, absorb the vertical and lateral shock loads, and carry out the final transfer of weights of the integrated deck to the jacket legs. The stabbing tip assembly is equipped with a plurality of spaced apart elastomeric member, disposed in between an outer sleeve member and an inner sleeve member to absorb vertical and lateral shock loads occurring between the jacket legs and depending legs.

U.S. Pat. No. 4,848,967 disclosed a load transfer system for mating an integrated deck onto offshore jacket legs. A shock load absorbing means is used in the system, coupled to the lower end of the deck legs. The shock load absorbing means includes a plurality of annular elastomeric discs retained within a central tube, wherein the annular elastomeric discs are subjected to compression of a hydraulic cylinder from below. The hydraulic cylinder, in turn, is connected to a piston to be received by a receptacle on the jacket legs.

The elastic or elastomeric components of the shock absorbing means in the prior arts may suffer a shortcoming of having low stiffness, and hence a low withstandable load capacity, such that the shock absorbing means is prone to failure when a higher load is applied. Besides that, the elastomeric material having low stiffness tends to take a large amount of deflection which is not desirable for mating the integrated deck to the jacket legs. This will impose a constraint to the design of the oil platform, as the recent trend in design of oil platform construction is towards a higher loading capacity which involves an increase in the weight of the structural components and consequently an increase in total weight. Furthermore, for an optimum platform design, the diameter of the jacket leg may not be enlarged and hence a mere increase in the size of the shock absorbing device would not be a feasible solution to the higher loading capacity of the oil platform. Therefore, a high load capacity shock absorbing device having an optimum force/deflection curve is needed to tend to the higher oil platform weight of contemporary design.

SUMMARY OF INVENTION

It is an objective of the present invention to provide a shock absorbing device having high loading capacity without increasing the surface area of the shock absorbing device for mating of an integrated deck to a fixed jacket leg.

It is also an objective of the present invention to provide a shock absorbing device having a force/deflection curve with a gradual increase in stiffness throughout the load applied during the mating process between the integrated deck and the jacket leg.

It is yet another objective of the present invention to provide a shock absorbing device which is resistant to damage due to the applied forces.

Accordingly, these objectives may be achieved by following the teachings of the present invention. The present invention relates to a shock absorbing device for mating an integrated deck to jacket leg, characterized by: a hollow constraining cylinder having a bottom closure, connected to the top of the jacket leg; an elastomer module provided in the hollow constraining cylinder, wherein inner diameter of the hollow constraining cylinder is larger than outer diameter of the elastomer module thereby forming an annular space; a plurality of reinforcing plates embedded within the elastomer module, vertically spaced apart from each other; a protective assembly comprising a elastomeric cap and a minimum of one protective ring mounted to the elastomeric cap; wherein during mating of the integrated deck to the jacket leg, a support column of the integrated deck abuts on the protective assembly and compresses the elastomer module to secure the connection of the integrated deck to the jacket leg.

BRIEF DESCRIPTION OF THE DRAWINGS

The features of the invention will be more readily understood and appreciated from the following detailed description when read in conjunction with the accompanying drawings of the preferred embodiment of the present invention, in which.

DETAILED DESCRIPTION OF THE INVENTION

Figure 1:
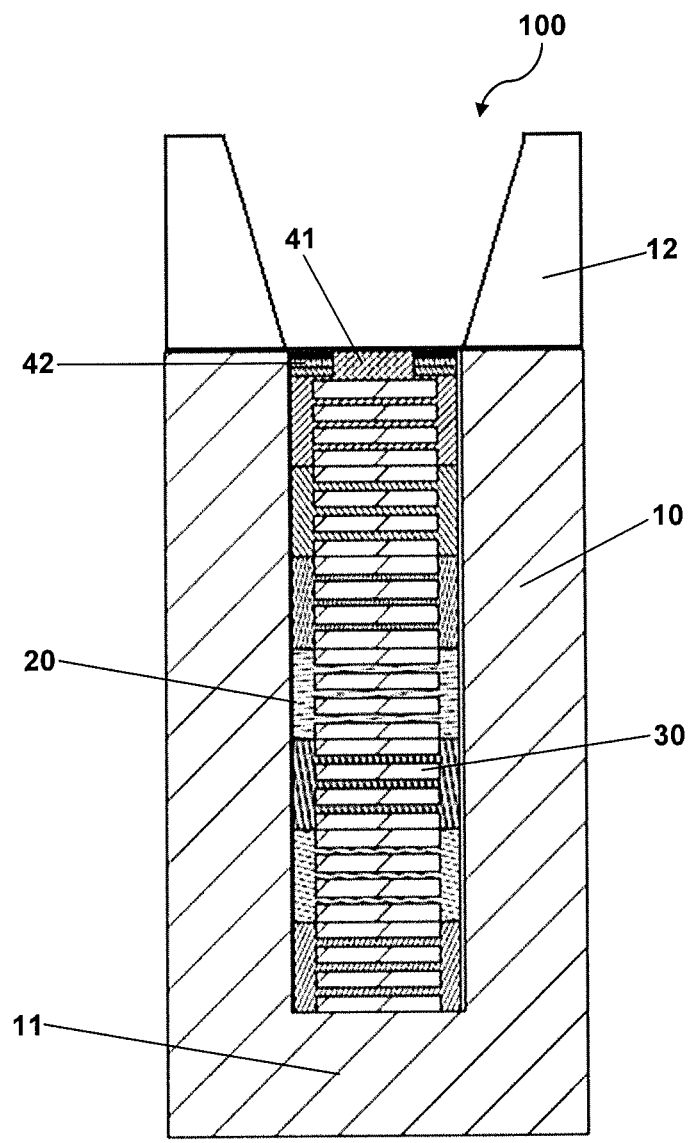
FIG. 1 is a vertical section view of a shock absorbing device in accordance with the present invention.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting but merely as a basis for claims. It should be understood that the drawings and detailed description thereto are not intended to limit the invention to the particular form disclosed, but on the contrary, the invention is to cover all modification, equivalents and alternatives falling within the scope of the present invention as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to. Further, the words "a" or "an" mean "at least one" and the word "plurality" means one or more, unless otherwise mentioned. Where the abbreviations of technical terms are used, these indicate the commonly accepted meanings as known in the technical field. For ease of reference, common reference numerals will be used throughout the figures when referring to the same or similar features common to the figures. The present invention will now be described with reference to FIGS. 1-5.

The present invention relates to a shock absorbing device (100) for mating an integrated deck to a jacket leg (51), characterized by:
- a hollow constraining cylinder (10) having a bottom closure (11), connected to the top of the jacket leg (51);
- an elastomer module (20) provided in the hollow constraining cylinder (10), wherein inner diameter of the hollow constraining cylinder (10) is larger than outer diameter of the elastomer module (20) thereby forming an annular space in between said hollow constraining cylinder (10) and said elastomer module (20);
- a plurality of reinforcing plates (30) embedded within the elastomer module (20), wherein the plurality of reinforcing plates (30) are vertically spaced apart from each other;
- a protective assembly comprising a elastomeric cap (41) and a minimum of one protective ring (42) mounted to the elastomeric cap (41) on top of the elastomer module (20) for preventing damage to the elastomer module (20) due to downward impact;
- wherein during mating of the integrated deck to the jacket leg (51), a support column (52) of the integrated deck abuts on the protective assembly and compresses the elastomer module (20) to secure the connection of the integrated deck to the jacket leg (51).

In a preferred embodiment of the shock absorbing device (100), the hollow constraining cylinder (10) is coupled to a receiving funnel (12) for receiving the support column (52).

In a preferred embodiment of the shock absorbing device (100), the elastomer module (20) is divided into a plurality of segments. More preferably, the elastomer module (20) is divided into seven segments.

In a preferred embodiment of the shock absorbing device (100), the four of the plurality of reinforcing plates (30) are embedded within each of the plurality of segments of the elastomer module (20).

In a preferred embodiment of the shock absorbing device (100), the elastomer module (20) has a composition comprising natural rubber, zinc oxide, stearic acid, carbon black, process oil, antioxidant, antiozonant, N-cyclohexyl-2-benzothiazole sulfenamide, and sulphur.

In a preferred embodiment of the shock absorbing device (100), the elastomer module (20) has a shear modulus in the range of 0.5-1.30 MPa In a preferred embodiment of the shock absorbing device (100), the plurality of reinforcing plates (30) is fabricated from steel.

In a preferred embodiment of the shock absorbing device (100), the protective ring (42) is fabricated from brass.

In a preferred embodiment of the shock absorbing device (100), the protective assembly has three protective rings (42).

With reference to FIG. 1, the shock absorbing device (100) of the present invention includes the hollow constraining cylinder (10) with the bottom closure (11) which is coupled to the top of the jacket leg (51). The wall of the hollow constraining cylinder (10) is preferably made of metals or other tough materials with adequate thickness to withstand the high pressure caused by the expansion of the elastomer module (20) under compression. A receiving funnel (12) is coupled to the hollow constraining cylinder (10) for receiving the support column (12) such that the support column (52) is guided to abut on the elastomeric cap (41) and protective ring (42) without hitting on the hollow constraining cylinder (10)

The elastomer module (20) is preferably placed centrally in the cavity of the hollow constraining cylinder (10), where the annular space is formed between the elastomer module (20) and the wall of the hollow constraining cylinder (10) to ensure gradual increase in stiffness of the elastomer module (20) when the integrated deck is slowly lowered until all the load is entirely supported by the jacket leg (51). The elastomer module (20) is preferably divided into the plurality of segments vertically stacked up on one another, for ease of manufacturing and installation.

Figure 2:
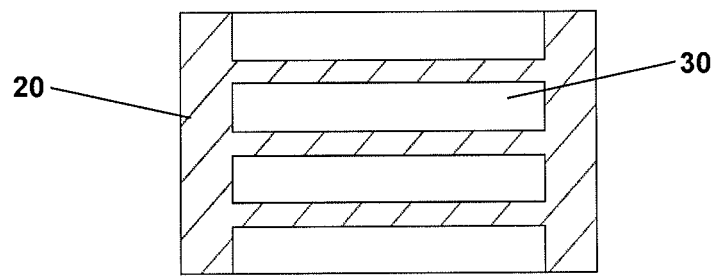
FIG. 2 is a vertical section view of a segment of an elastomer module of the shock absorbing device.
Figure 5:
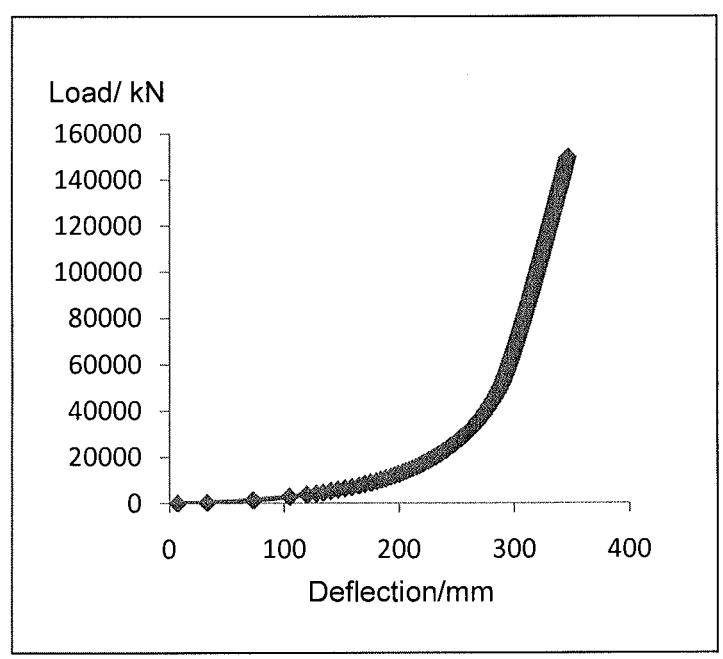
FIG. 5 is a graph showing the change in deflection (mm) of the shock absorbing device in response to variable compression load (kN).

FIG. 2 shows one of the plurality of segments of the elastomer module (20). A preferred embodiment of the present invention is to divide the elastomer module (20) into seven segments. The elastomer module (20) has a preferred composition comprising natural rubber, zinc oxide, stearic acid, carbon black, process oil, antioxidant (N-(1,3-dimethybutyl)-N'-phenyl-1,4-phenylene-diamine, HPPD), antiozonant, N-cyclohexyl-2-benzothiazole sulfenamide (CBS), and sulphur. The main component in the elastomer module (20) is preferably natural rubber, and more preferably a high quality SMR (Standard Malaysian Rubber) CV 60. The shear modulus of the elastomer module (20) is preferably within the range of 0.5-1.3 MPa. The composition of the elastomer module (20) can be adjusted to produce elastomer with different shear modulus so that the required force/deflection curve such as shown in FIG. 5 can be achieved for platforms or integrated decks of different weights.

The elastomer module (20) is embedded with a plurality of reinforcing plates (30) which are uniformly spaced from each other. Preferably, four of the reinforcing plates (30) are embedded in one of the plurality of segments of the elastomer module (20). The plurality of reinforcing plates (30) are used to gradually increase the stiffness of the shock absorbing device (100) and at the same time increase the stability of the shock absorbing device (100). The plurality of reinforcing plates (30) is preferably fabricated from steel for better resistance to deformation.

Figure 3:
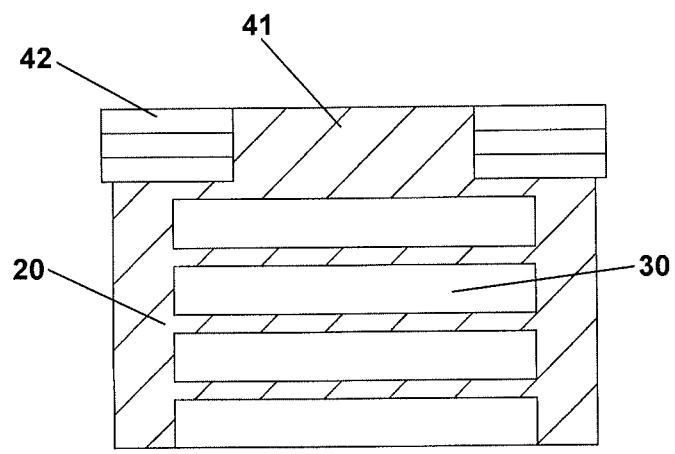
FIG. 3 is a vertical section view of the elastomer module segment coupled with a protective assembly.

With reference to FIG. 1 and FIG. 3, the protective assembly comprising a elastomeric cap (41) and a minimum of one protective ring (42) mounted to the elastomeric cap (41)

which is coupled on top of the elastomer module (20) for preventing damage to the elastomer module (20) due to downward impact. Preferably, the protective ring (42) comprises three rings for ease of manufacturing and installation. The material for fabricating the protective ring (42) should be softer than the support column (52) of the integrated deck but harder than the elastomer module (20). A preferred material for fabricating the protective ring (42) is, but not in any way limited to, brass.

Figure 4:
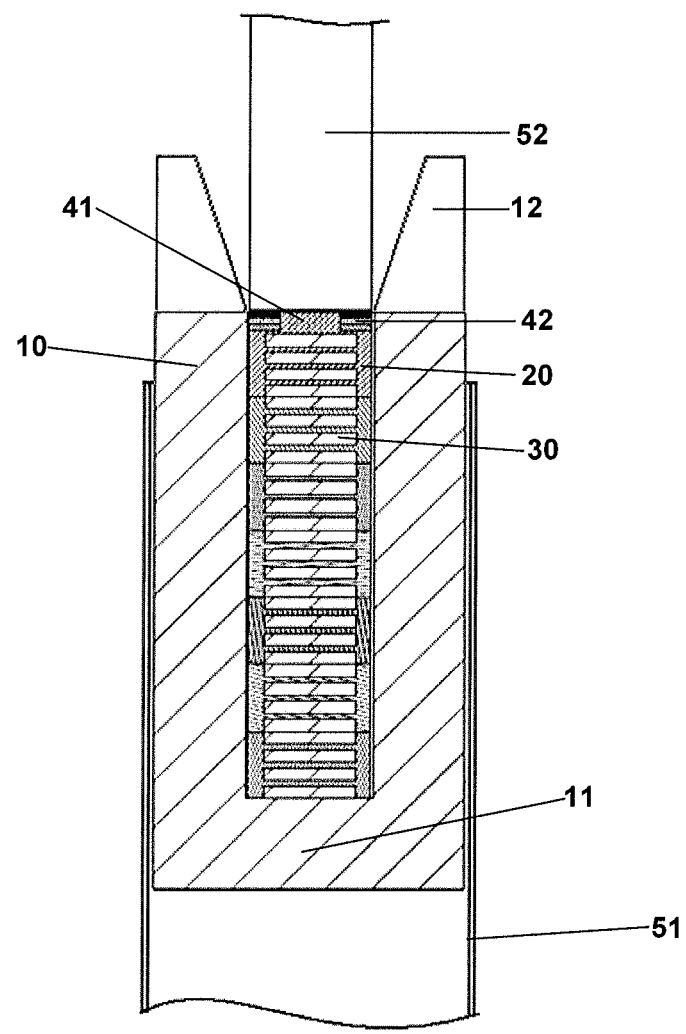
FIG. 4 is a vertical section view of the shock absorbing device connected to a support column of an integrated deck and a jacket leg.

For installation of the integrated deck to the jacket leg (51), the integrated deck constructed on-shore will be transported to the site of the jacket leg (51). The support column (52) of the integrated deck will be connected to the corresponding jacket leg (51) already installed off-shore, having the shock absorbing device (100) coupled to the top of the jacket leg (51). During the process of mating the integrated deck to the jacket leg (51), the support column (52) of the integrated deck is aligned to its associated jacket leg (51). Then, the integrated deck is lowered down such that the support column (52) abuts on the protective assembly, and subsequently compresses the elastomer module (20) as the support column (52) is further lowered down. The alignment of the support column (52) is facilitated and guided by the receiving funnel (12) so that the support column does not hit the hollow constraining cylinder (10). The connection of the shock absorbing device (100) to the support column (52) of the integrated deck and the jacket leg (51) is illustrated in FIG. 4. It is to be understood that, the described connection of the shock absorbing device (100) to the support column (52) and the jacket leg (51) is a simplified general connection system and should not in any way impose limit to the use of other relevant components such as piston, hydraulics, and the like for facilitating the mating process.

Below is an example of the shock absorbing device (100) from which the advantages of the present invention may be more readily understood. It is to be understood that the following example is for illustrative purpose only and should not be construed to limit the present invention in any way.

EXAMPLE

Based on the experimentally tested result, a preferred implementation of the present invention will now be described, for having optimum load capacity, displacement, stability, and ease of manufacturing. The elastomer module (20) is divided into seven segments stacked vertically in the cavity of the constraining cylinder (10). The composition of the elastomer module (20) having a shear modulus of 1.25 MPa is shown in Table 1. Each of the segments is 550 mm high and 1000 mm in diameter. Four steel reinforcing plates (30) are inserted with equal distance from each other in the segment, whereby each steel reinforcing plate (30) is 100 mm thick and has a diameter of 750 mm. The elastomer module (20) is placed centrally inside the hollow constraining cylinder (10) so that there is an annular space of 25 mm between the outer diameter of the elastomer module (20) and the inner diameter of the hollow constraining cylinder (10). Inserted at the topmost of the segments of the elastomer module (20) are three brass protective rings (42) and each is 50 mm thick with an inner and outer diameter of 500 mm and 1045 mm respectively. The elastomeric cap (41) has a height of 150 mm.

The implementation of the present invention described above would be able to support the combined static and dynamic loads of up to 150,000 kN and a compressive stress of about 250 MPa. The assembly of the shock absorbing device (100) is then installed inside the jacket leg (51).

Due to the constraint in the laboratory scale testing facilities, the size of the shock absorbing device (100) above being tested is scaled down by a factor of 25 proportionately. FIG. 5 is the force/deflection curve of the scaled-down shock absorbing device (100) obtained by compression test machine but with the force and deflection values scaled up by 25 times.

TABLE 1

Composition of the elastomer module

| Ingredients | Compound (phr) |
| --- | --- |
| SMR CV 60 | 100.0 |
| Zinc oxide | 3.5 |
| Stearic acid | 2.0 |
| Carbon black N762 | 85.0 |
| Naphthenic oil | 5.0 |
| Antioxidant/HPPD | 3.0 |
| Antiozonant/wax | 2.0 |
| Sulphur | 2.5 |
| CBS | 0.7 |

Although the present invention has been described with reference to specific embodiments, also shown in the appended figures, it will be apparent for those skilled in the art that many variations and modifications can be done within the scope of the invention as described in the specification and defined in the following claims.

Description of the reference numerals used in the accompanying drawings according to the present invention:

| Reference Numerals | Description |
| --- | --- |
| 100 | Shock absorbing device |
| 10 | Hollow constraining cylinder |
| 11 | Bottom closure |
| 12 | Receiving funnel |
| 20 | Elastomer module |
| 30 | Reinforcing plates |
| 41 | Elastomeric cap |
| 42 | Protective ring |
| 51 | Jacket leg |
| 52 | Support column of the integrated deck |

We claim:

1. A shock absorbing device (100) for mating an integrated deck to a jacket leg (51), comprising:
a hollow constraining cylinder (10) having a bottom closure (11), connected to the top of the jacket leg (51);
an elastomer module (20) provided in the hollow constraining cylinder (10), wherein inner diameter of the hollow constraining cylinder (10) is larger than outer diameter of the elastomer module (20) thereby forming an annular space in between said hollow constraining cylinder (10) and said elastomer module (20);
a plurality of reinforcing plates (30) embedded within the elastomer module (20), wherein the plurality of reinforcing plates (30) are vertically spaced apart from each other;
a protective assembly comprising an elastomeric cap (41) and a minimum of one protective ring (42) mounted to the elastomeric cap (41) on top of the elastomer module (20) for preventing damage to the elastomer module (20) due to downward impact;
wherein during mating of the integrated deck to the jacket leg (51), a support column (52) of the integrated deck abuts on the protective assembly and compresses the elastomer module (20) to secure the connection of the integrated deck to the jacket leg (51), and the expansion of the compressed elastomer module (20) is constrained by the hollow constraining cylinder (10), wherein the elastomer module (20) is divided into seven segments and each segment is 550 mm high and 1000 mm in diameter, each reinforcing plate (30) is 100 mm thick and 750 mm in diameter, the width of the annular space between the outer diameter of the elastomer module (20) and the inner diameter of the hollow constraining cylinder (10) is 25 mm, the protective ring is 50 mm thick and has an inner diameter of 500 mm and an outer diameter of 1045 mm, and the elastomeric cap has a height of 150 mm, and wherein the shear modulus of the elastomer module (20) is 1.25 MPa.

2. The shock absorbing device (100) for mating an integrated deck to a jacket leg (51) according to claim 1, wherein the hollow constraining cylinder (10) is coupled to a receiving funnel (12) for receiving the support column (52).

3. The shock absorbing device (100) for mating an integrated deck to a jacket leg (51) according to claim 1, wherein the elastomer module (20) is divided into a plurality of segments.

4. The shock absorbing device (100) for mating an integrated deck to a jacket leg (51) according to claim 1, wherein four of the plurality of reinforcing plates (30) are embedded within each of a plurality of segments of the elastomer module (20).

5. The shock absorbing device (100) for mating an integrated deck to a jacket leg (51) according to claim 1, wherein the elastomer module (20) has a composition comprising natural rubber, zinc oxide, stearic acid, carbon black, process oil, antioxidant, antiozonant, N-cyclohexyl-2-benzothiazole sulfenamide, and sulphur.

6. A shock absorbing device (100) for mating an integrated deck to a jacket leg (51) according to claim 1, wherein the plurality of reinforcing plates (30) is fabricated from steel.

7. A shock absorbing device (100) for mating an integrated deck to a jacket leg (51) according to claim 1, wherein the protective ring (42) is fabricated from brass.

8. A shock absorbing device (100) for mating an integrated deck to a jacket leg (51) according to claim 1, wherein the protective assembly has three protective rings (42).

9. The shock absorbing device (100) for mating an integrated deck to a jacket leg (51) according to claim 1, wherein the shear modulus of the elastomer module (2) is 1.25 MPa.

* * * * *